United States Patent
Makarow et al.

(10) Patent No.: US 11,258,380 B2
(45) Date of Patent: Feb. 22, 2022

(54) CONTROL DEVICE AND CORRESPONDING PRODUCTION METHOD

(71) Applicant: Mahle International GmbH, Stuttgart (DE)

(72) Inventors: Eugen Makarow, Ludwigsburg (DE); Edgar Salfeld, Lichtenwald (DE); Florian Wetzel, Baltmannsweiler (DE)

(73) Assignee: Mahle International GmbH

( * ) Notice: Subject to any disclaimer, the term of this patent is extended or adjusted under 35 U.S.C. 154(b) by 409 days.

(21) Appl. No.: 15/948,680

(22) Filed: Apr. 9, 2018

(65) Prior Publication Data

US 2018/0294749 A1 Oct. 11, 2018

(30) Foreign Application Priority Data

Apr. 10, 2017 (DE) .......................... 102017206128.6

(51) Int. Cl.
| | |
|---|---|
| *H02P 5/747* | (2006.01) |
| *F16K 31/04* | (2006.01) |
| *G05D 7/06* | (2006.01) |
| *H02K 5/04* | (2006.01) |
| *H02K 1/00* | (2006.01) |

(52) U.S. Cl.
CPC .............. *H02P 5/747* (2013.01); *F16K 31/04* (2013.01); *G05D 7/0635* (2013.01); *H02K 1/00* (2013.01); *H02K 5/04* (2013.01); *H02K 2213/09* (2013.01); *H02K 2213/12* (2013.01)

(58) Field of Classification Search
CPC ........ H02P 5/747; G05D 7/0635; F16K 31/04
See application file for complete search history.

(56) References Cited

U.S. PATENT DOCUMENTS 3,371,236 A * 2/1968 Swanke ................... H02K 5/04
310/89
5,184,039 A 2/1993 Kraft
(Continued)

FOREIGN PATENT DOCUMENTS

CN 201219219 Y * 4/2009
CN 201219219 Y 4/2009
(Continued)

OTHER PUBLICATIONS

English abstract for DE-10 2013 101 939.
Chinese Office Action dated Nov. 27, 2020 for copending Chinese Appl. No. CN201810251255.3.

*Primary Examiner* — Kawing Chan
*Assistant Examiner* — Bradley R Brown
(74) *Attorney, Agent, or Firm* — Fishman Stewart PLLC

(57) ABSTRACT

A method for producing a control device for mechanically controlling a component. The control device may have a device housing including a motor accommodating space in which an electric motor is arranged. The electric motor may include a motor housing having a stator and a rotor, the rotor including a rotor shaft. The method may include selecting an electric motor from a plurality of electric motors each suitable for a specified application. Each of the plurality of electric motors may have a different respective axial motor length and may have a same respective motor cross section. Further, the method may include adapting the motor accommodating space to the respective axial motor length of the selected electric motor.

20 Claims, 4 Drawing Sheets

(56) References Cited

U.S. PATENT DOCUMENTS

| | | | |
|---|---|---|---|
| 5,488,259 A | | 1/1996 | Cho |
| 6,336,434 B1* | | 1/2002 | Shomura ............... F02B 61/045 |
| | | | 123/179.29 |
| 2002/0179233 A1* | | 12/2002 | Ruotsalainen ...... B29C 65/1654 |
| | | | 156/272.8 |
| 2004/0195928 A1* | | 10/2004 | Skofljanec ............. H02K 23/66 |
| | | | 310/239 |
| 2011/0221293 A1* | | 9/2011 | Katoh ...................... H02K 9/22 |
| | | | 310/83 |
| 2013/0106212 A1* | | 5/2013 | Nakazumi ................ H02K 9/22 |
| | | | 310/65 |
| 2014/0103753 A1 | | 4/2014 | Kezar |
| 2015/0128499 A1* | | 5/2015 | Hellwig .................. E05F 15/53 |
| | | | 49/358 |
| 2015/0236573 A1* | | 8/2015 | Takei ................... H02K 11/225 |
| | | | 310/112 |
| 2015/0308529 A1 | | 10/2015 | Ambs et al. |
| 2019/0219052 A1* | | 7/2019 | Yamaguchi ......... F04C 15/0088 |

FOREIGN PATENT DOCUMENTS

| | | |
|---|---|---|
| CN | 201263104 Y | 6/2009 |
| DE | 10 2013 101 939 A1 | 8/2014 |
| EP | 0 471 876 A1 | 2/1992 |
| WO | 2012/168 110 A1 | 12/2012 |

\* cited by examiner

CONTROL DEVICE AND CORRESPONDING PRODUCTION METHOD

CROSS-REFERENCE TO RELATED APPLICATIONS

This application claims priority to German Patent Application No. DE 10 2017 206 128.6, filed on Apr. 10, 2017, the contents of which are hereby incorporated by reference in its entirety.

TECHNICAL FIELD

The present invention relates to a control device for mechanically controlling a component as well as to a method for producing such a control device.

BACKGROUND

Control devices, by means of which a component can be controlled, are used in many areas of the technology. Applications on internal combustion engines or in motor vehicles, respectively, are thereby of particular interest. For example, such control devices can be used to control fresh air valves or exhaust gas valves or throttle valves or exhaust gas recirculation valves or Wastegate valves or variable turbine geometries. The use in a thermostatic valve is possible as well, e.g. for an optimized thermal management of an internal combustion engine or generally in a vehicle. Control devices comprising an electromotive drive are increasingly used thereby. Such an electromotive control device comprises a device housing, which includes a motor accommodating space, in which an electric motor is arranged, which has a motor housing comprising stator and a rotor comprising rotor shaft.

The respective control device thereby requires different drive powers for different applications. One option for adapting the control device to different power requirements is to use different electric motors. Electric motors, which have different powers, can differ from one another by different motor types, e.g. direct current, alternating current or three-phase motors. With the same motor type, electric motors comprising a different motor power can differ from one another e.g. by different windings, different diameters and different lengths. Varying geometries of different electric motors, however, are associated with corresponding variations on the device housing. On principle, a corresponding device housing can be provided for every power alternative of the electric motor, whereby the creation of variations in the control device is comparatively expensive.

SUMMARY

The present invention deals with the problem of specifying an improved embodiment for a control device of the above-described type or for a method for producing such a control device, respectively, which is characterized in particular in that a creation of variations with regard to different motor powers can be realized with comparatively low production costs.

According to the invention, this problem is solved by means of the subject matter of the independent claim(s). Advantageous embodiments are the subject matter of the dependent claim(s).

The invention is based on the general idea of realizing different motor powers in that different electric motors have different axial motor lengths, while they have the same motor cross sections. In other words, to realize different electric motors, the geometry thereof is only varied with regard to the axial length, while the motor cross section remains constant. Notwithstanding the above, the electric motors can still be varied, e.g. also via the design of the windings and/or the motor type, as long as the motor cross section remains the same. To now be able to produce a control device comprising a predetermined power, an electric motor is initially chosen, which is suitable for the respective application. The motor accommodating space of the device housing is subsequently adapted to the motor length of the selected electric motor. To adapt the control device to different power requirements, only one dimension within the geometry of the control device thus needs to be adapted, namely the length of the motor accommodating space, which is provided to accommodate the respective electric motor. For example, a cross section of the device housing can thus in particular remain the same for all variations. It is further possible to also keep further components of the control device, such as for example a coupling to an output of the control device and/or a gear drive the same.

A plurality of different options, which will be described in more detail below by means of preferred embodiments, now result for the adaptation of the motor accommodating space to the motor length of the selected electric motor.

According to a first preferred embodiment, the adaptation of the motor accommodating space can occur in that a cover, which is suitable for the selected electric motor, is selected for closing the device housing. In the installed state, the respective cover axially limits the motor accommodating space. Different covers differ from one another in that they define different axial dimensions for the motor accommodating space. For example, the respective cover can be embodied in a cup-shaped manner and can have a substantially flat cup bottom and a substantially cylindrical cup jacket. Different covers can differ from one another for example by means of different axial heights of this cup jacket. The motor accommodating space can thus be adapted to different electric motors in a particularly simple manner by using different covers.

A further development, in which the device housing is the same for all covers and electric motors, is particularly advantageous thereby. In this embodiment, the adaptation of the motor accommodating space thus occurs only by means of the selection of a suitable cover. The provision of different covers with unchanged device housing can be realized in a particularly cost-efficient manner.

Another further development proposes for the device housing and the cover to each consist of plastic, wherein the cover is advantageously welded to the device housing. This results in a particularly cost-efficient production for the control device. The cover, which is welded on, also effects a tight closure of the motor accommodating space, which results in an efficient protection of the electric motor against contaminations.

In the alternative, the device housing and the cover can consist of metal, wherein the cover is then advantageously fastened to the device housing by means of a crimped connection. An efficient sealing of the motor accommodating space can also be realized here in a cost-efficient manner, a seal can thereby preferably be used between device housing and cover in the crimped connection. Such a crimped connection with or without separate seal can also be used when the device housing is made of plastic.

A further development, in which the device housing is designed for the smallest or shortest electric motor, respectively, is advantageous here. As a result, it is in particular possible that the cover, which matches the shortest electric motor, is embodied in a substantially plate-shaped manner, thus in particular does not have a noteworthy cup jacket. In the case of all other, longer electric motors, the cover, in contrast, is embodied in a cup-shaped manner, so that a noteworthy cup jacket protrudes from the cup bottom.

In a second preferred embodiment, the adaptation of the motor accommodating space can occur in that a spacer element, which is suitable for the selected electric motor, is selected to bridge an axial distance between an axial inner side of the device housing, which axially limits the motor accommodating space, and an axial outer side of the motor housing, which faces this axial inner side. In this case, the device housing is not designed for the shortest electric motor, but for a longer, in particular for the longest electric motor. A spacer element is then used for the optimal positioning of the electric motor inside the motor accommodating space, wherein different motor lengths can be compensated with the help of different spacer elements. The electric motor can for example always be positioned in such a way in the motor accommodating space that the rotor shaft can be engaged with a corresponding output side of the control device in a particularly simple manner for the torque transmission.

A further development, in which the spacer element is a spring, which can automatically adapt to different axial lengths of the respectively used electric motor, is advantageous. To be able to ensure a defined axial pretensioning in the case of all motor lengths, different springs are used, which differ from one another by different axial lengths. In the alternative, the spacer element can also be a sleeve, whereby different sleeves, which differ from one another by different axial heights, are then used to adapt the motor accommodating space to different electric motors.

Another further development proposes for the device housing to be designed for the largest or longest electric motor, respectively. As a result, the same device housing can always be used for all electric motors, which are used. The same cover can likewise always be used to close the motor accommodating space. Cover and device housing can thus be realized in a structurally identical manner for all variations, thus as identical parts. Only the spacer elements vary.

Another further development proposes for the adaptation of the motor accommodating space to the largest electric motor to occur in that no spacer element is selected for this case or that no spacer element is inserted into the motor accommodating space, respectively. Due to said adaptation, there is no axial distance between the inner side of the device housing and the outer side of the motor housing, which needs to be bridged, in this case. Inner side and outer side in particular come into direct contact with one another here.

According to a third preferred embodiment, the adaptation of the motor accommodating space can occur in that an axial stop, which is arranged in the motor accommodating space and which is integrally molded on the device housing and which axially limits an axial insertion depth of the electric motor into the motor accommodating space, is shortened to an axial height, which is suitable for the selected electric motor. A separate spacer element is forgone in this case. In fact, an integrally molded spacer element, namely said axial stop, is resorted to, wherein the axial stop is shortened as needed in order to achieve the desired adaptation to the respective electric motor. The provision of different separate spacer elements can be dispensed with hereby. In this embodiment, it is also possible to embody the device housing and a corresponding cover as identical part in each case for all motor lengths, which can be used, whereby the creation of variations is particularly cost-efficient.

An embodiment, in the case of which the axial stop, which is molded on the device housing, is designed for the smallest or shortest electric motor, respectively, with regard to its axial height is also advantageous here. A shortening of the axial stop thus only needs to be carried out when a larger electric motor is used. Due to said design, the adaptation of the motor accommodating space to the smallest electrical motor is simplified, because the axial stop does not need to be shortened with regard to its axial height in this case.

A control device according to the invention, which can be produced for example by means of the production method according to the second or third preferred embodiment, is characterized in that the electric motor included therein can be exchanged by an electric motor comprising a different motor length, without having to exchange the device housing and a cover, which may be present, for this purpose. For this purpose, the control device has a device housing, which includes a motor accommodating space, in which an electric motor is arranged, which has a motor housing comprising stator and a rotor comprising rotor shaft. An axial distance, which is defined by an axial stop or by a spacer element, is embodied axially between an axial inner side of the device housing, which axially limits the motor accommodating space, and an opposite axial outer side of the motor housing. This axial distance can be changed, in particular reduced, by exchanging and/or by processing the axial stop or the spacer element, so that an electric motor comprising a different, in particular larger axial motor length can be inserted into the motor accommodating space.

Further important feature and advantages of the invention follow from the subclaims, from the drawings and from the corresponding figure description by means of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the description below, whereby identical reference numerals refer to identical or similar or functionally identical components.

BRIEF DESCRIPTION OF THE DRAWINGS

In each case schematically

DETAILED DESCRIPTION

Figure 1:
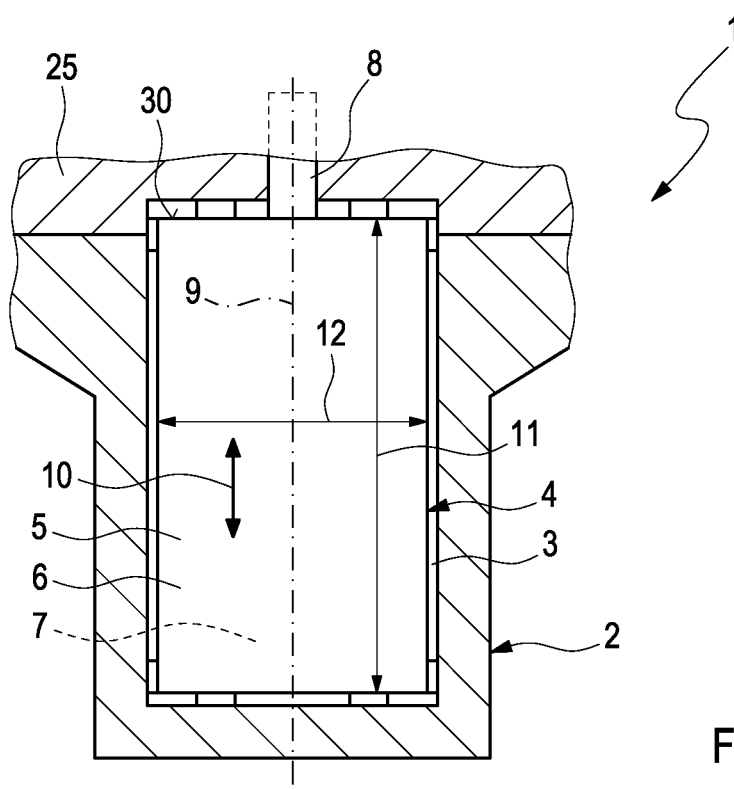
FIG. 1 shows a highly simplified longitudinal section of a control device comprising electric motor, FIGS. 2 and 3 in each case show a longitudinal section as in FIG. 1 in a first variation of a first embodiment for electric motors comprising different motor length.

According to FIG. 1, a control device 1, which serves to mechanically control a non-illustrated component, comprises a device housing 2, which includes a motor accommodating space 3. The control device 1 serves for example to control a valve for controlling a cross section, which can be flown through, or to operate a valve for controlling a gas flow. For drive-coupling with the respective component, which is to be controlled, the control device 1 has an output, which is suitable for this purpose, such as, e.g. a pivot arm, a pinion or an output shaft, which is not illustrated here.

The control device 1 is defined as electromotive control device 1 and accordingly has an electric motor 4, which is arranged in the motor accommodating space 3. The electric motor 4 has a motor housing 5 comprising a stator 6 as well as a rotor 7 comprising a rotor shaft 8, which is axially guided out of the motor housing 5 on a front side 30 of the electric motor 4. The rotor shaft 8 is drive-coupled to the above-mentioned output of the control device 1 in a suitable manner, which is not shown here. This drive coupling can comprise a gear drive. During operation of the electric motor 4, the rotor 7 rotates around an axis of rotation 9. The axis of rotation 9 defines an axial direction, which is suggested by means of a double arrow and which is identified with 10 in FIG. 1. The axial direction 10 extends parallel to the axis of rotation 9. Parallel to the axial direction 10, the electric motor 4 has an axial motor length 11. Transversely to the axial direction 10, the electric motor 4 has a motor cross section 12.

To be able to adapt the control device 1 to different applications, different electric motors 4 can be used. The different electric motors 4 are to thereby differ from one another by different axial motor lengths 11, while they have the same motor cross sections 12. The different electric motors 4 in particular have different drive powers. To now be able to adapt the motor accommodating space 3 to the different electric motors 4 or to the different motor lengths 11, respectively, a plurality of different ways, which can at least partially be combined with one another, will be shown below by means of FIGS. 2 to 8.

According to FIGS. 2 to 5, it is possible for example according to a first embodiment to realize the adaptation of the motor accommodating space 3 to different motor lengths 11 in that different covers 13 are used to axially limit the motor accommodating space 3. The respective cover 13 thereby closes the motor accommodating space 3 in the area of a rear side 31 of the electric motor 4, which faces axial away from the front side 30 thereof. The different covers 13 differ from one another in that they define different axial dimensions for the motor accommodating space 3. The axial dimension of the motor accommodating space 3 is in each case identified with 14 in FIGS. 2 to 4. A percentage of this dimension 14, which is defined by the device housing 2, is further identified with 15, while a percentage of the dimension 14, which is defined by the cover 13, is identified with 16. The percentage 16 of the dimension 14, which accounts for the cover 13, can quasi be neglected in the examples of FIGS. 2 and 4, so that the axial dimension 14 of the motor accommodating space 3 is defined essentially or mainly, respectively, in the ideal case exclusively by the percentage 15 of the device housing 2 in this case. The cover 13 is embodied in a substantially cup-shaped manner in the examples of FIGS. 2 and 4. In contrast, FIGS. 3 and 5 in each case show an embodiment, in which the percentage 16 of the cover 13 of the axial dimension 14 of the motor accommodating space 3 is noteworthy. The cover 13 is in each case embodied in a cup-shaped manner in these examples, so that it has a cup bottom 17 and a cup jacket 18. This cup jacket 18 extends from the cup bottom 17 in the direction of the device housing 2 and creates the desired axial extension or the percentage 16, respectively, of the axial dimension 14 of the motor accommodating space 3.

As can be seen, the device housing 2 can remain structurally identical in the case of different covers 13, so that different electric motors 4 can be used with the same device housing 2 to realize the respective control device 1.

Figure 2:
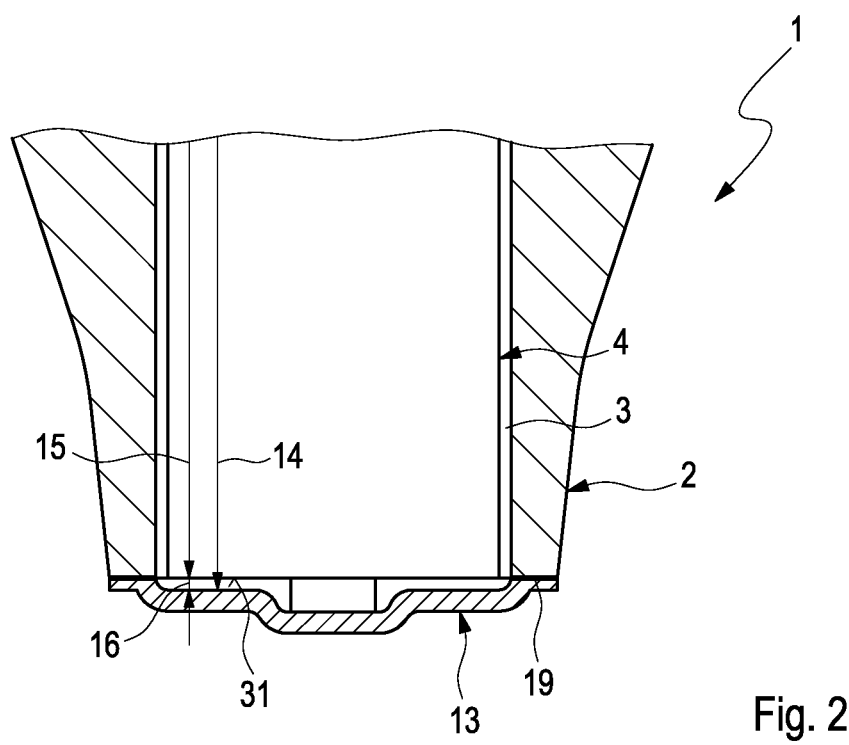
Figure 3:
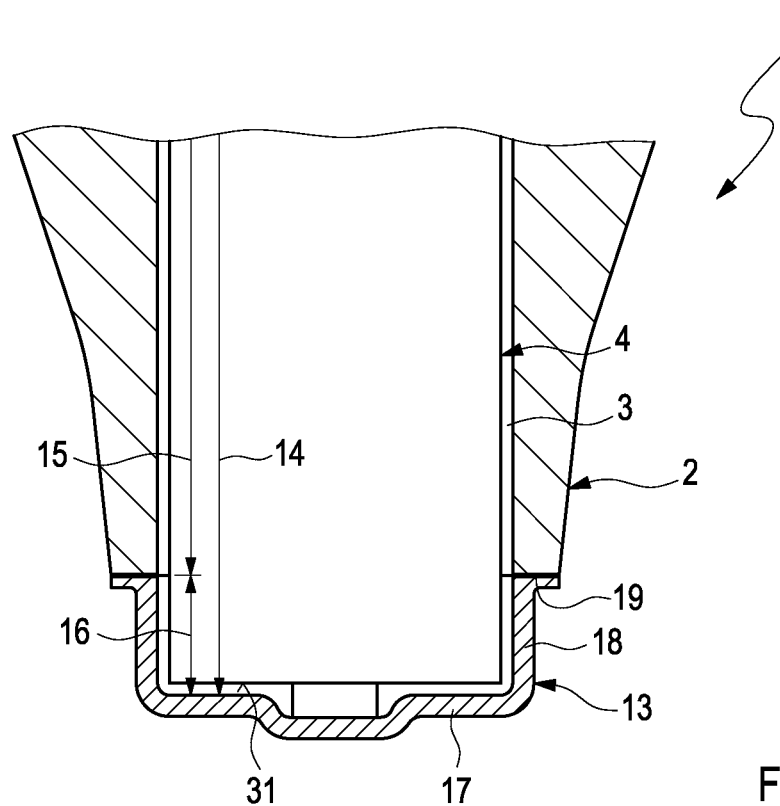

In a first variation according to FIGS. 2 and 3, the device housing 2 and the cover 13 each consist of a plastic. The cover 13 is advantageously welded to the device housing 2 in this case. A corresponding weld seam is identified with 19 in FIGS. 2 and 3.

Figure 4:
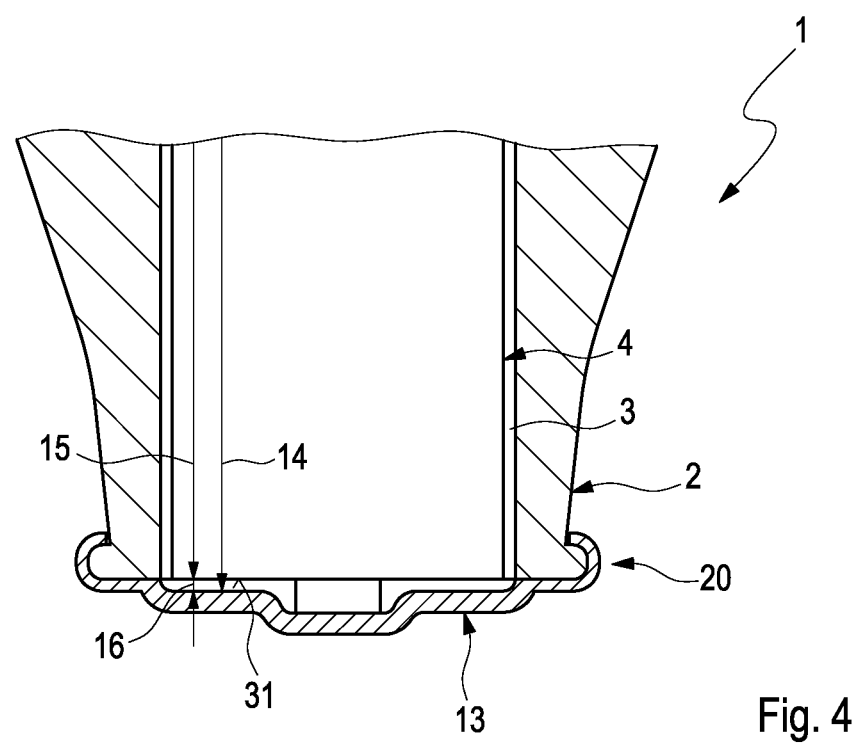
FIGS. 4 and 5 show longitudinal sections as in FIGS. 2 and 3, but in a second variation of the first embodiment.
Figure 5:
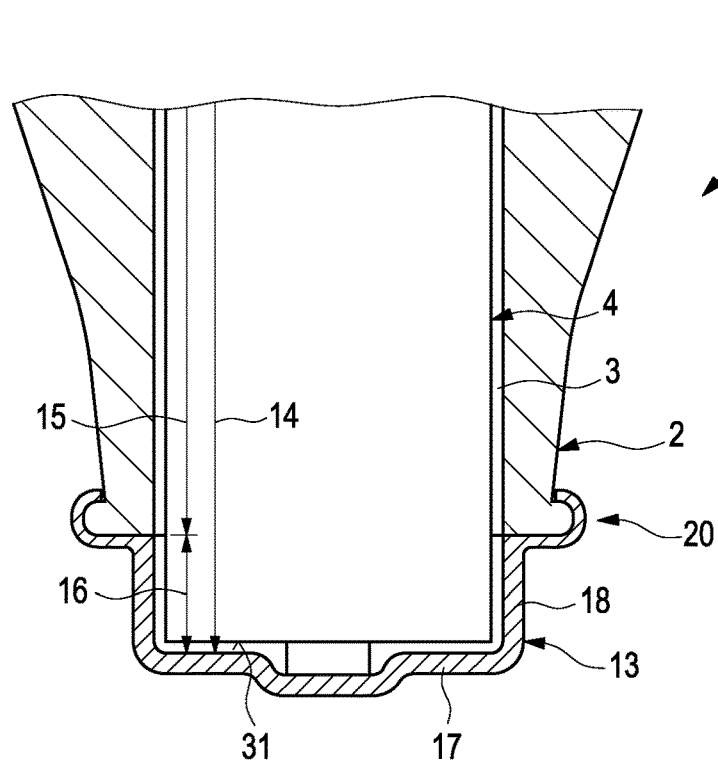

In a second variation according to FIGS. 4 and 5, at least the cover 13 is made of metal. The device housing 2 and the cover 13 are each preferably made of metal. In the case of a metallic cover 13, the cover 13 can advantageously be fastened to the device housing 2 by means of a crimped connection 20. The device housing 2 can thereby be made of metal or of plastic. A non-illustrated seal is advantageously arranged here in the crimped connection 20 to seal the device housing 2 and the cover 13 against one another.

In the examples of FIGS. 2 to 5, the device housing 2 is advantageously designed for the smallest or shortest electric motor 4, thus for the electric motor 4 comprising the smallest axial motor length 11, which is provided for use in the control device 1. The cover 13, which is provided for the shortest electric motor 4, thus does not need to contribute to the axial dimension 14 of the motor accommodating space 3.

Figure 6:
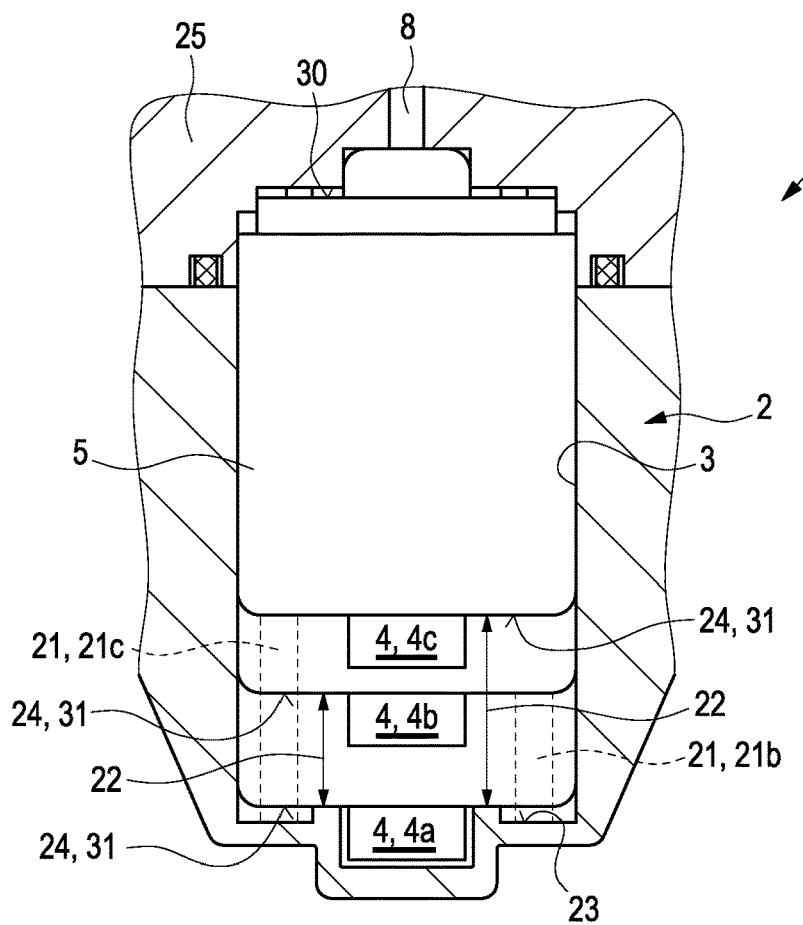
FIG. 6 shows a longitudinal section as in FIG. 1, but in a second embodiment.
Figure 7:
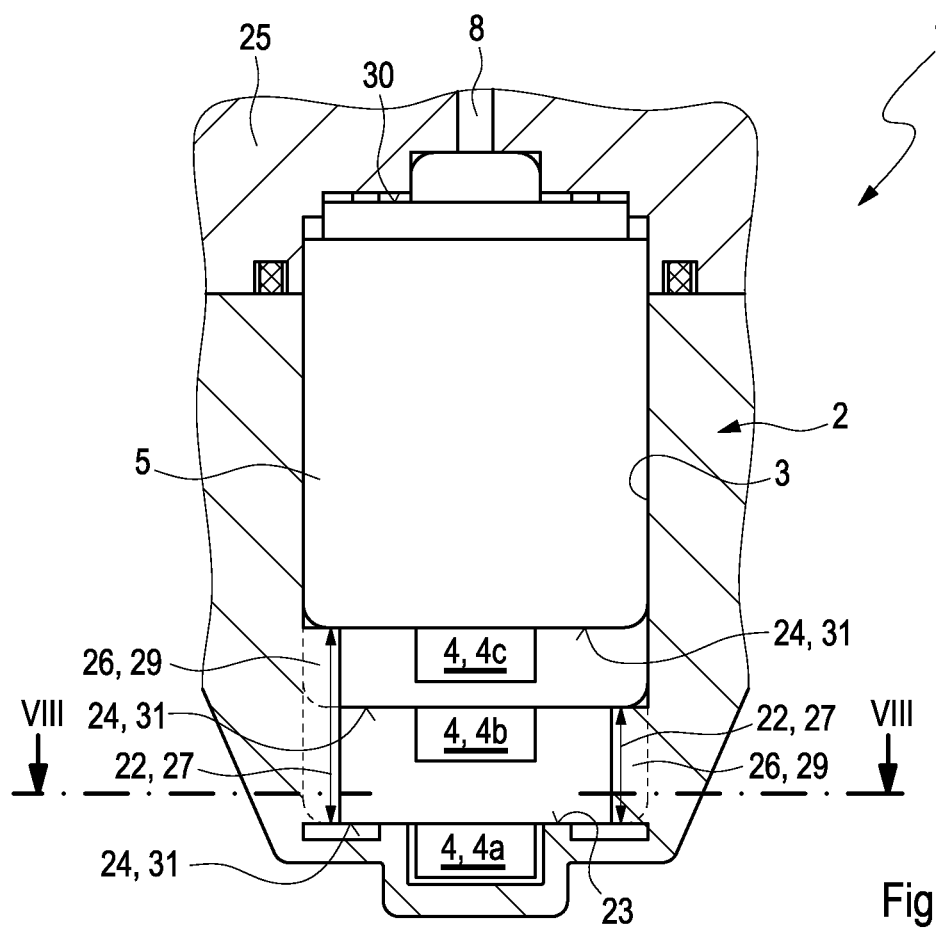
FIG. 7 shows a longitudinal section as in FIG. 1, but in a third embodiment.
Figure 8:
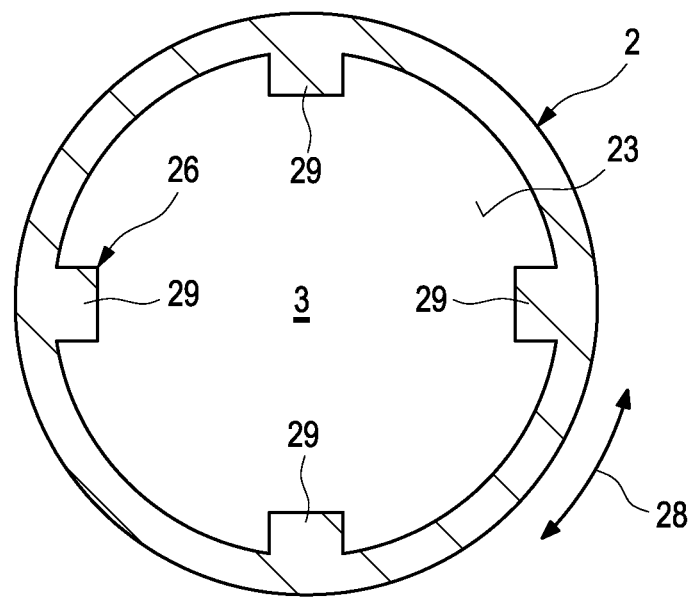
FIG. 8 shows a cross section of the control device according to sectional lines VIII in FIG. 7.

The examples of FIGS. 6 and 7 relate to a second embodiment (FIG. 6) and a third embodiment (FIG. 7), in the case of which the adaptation of the motor accommodating space 3 to different motor lengths 11 is realized with other means. For illustration purposes, three electric motors 4 of different lengths are in each case illustrated in FIGS. 6 and 7, namely a longer electric motor 4a, an average electric motor 4b, thus an electric motor 4 of an average length, as well as a shorter electric motor 4c.

According to the second embodiment according to FIG. 6, the adaption of the motor accommodating space 3 to electric motors 4 of different lengths occurs in this example in that a spacer element 21, which is suitable for the respectively selected electric motor 4, is used. Two variations for such a spacer element 21 are illustrated in the example of FIG. 6, namely a spacer element 21b for the average electric motor 4b and a longer spacer element 21c for the shorter electric motor 4c. The respective spacer element 21 thereby serves to bridge an axial distance 22, which, depending on the electric motor 4, is established axially between an axial inner side 23, which axially limits the motor accommodating space 3, and an axial outer side 24 of the motor housing 5, which faces this axial inner side 23. This axial outer side 24 of the motor housing 5 corresponds to the rear side 31 of the electric motor 4. In other words, the electric motor 4 is axially supported on the device housing 2 via the respective spacer element 21. The spacer element 21 is hereby axially in contact with the axial inner side 23 of the device housing 2 on the one hand and axially in contact with the axial outer side 24 of the motor housing 5 on the other hand. With its front side 30, the electric motor 4 can always be positioned identically relative to the device housing 2 with the help of these spacer elements 21, so that for example the rotor shaft 8, which is guided out of the motor housing 5, can always be coupled to the mentioned output of the control device 1 in the same way.

The respective spacer element 21 can for example be an annular sleeve. It is likewise conceivable to embody the spacer element 21 as spring, which introduces an axial pretensioning into the electric motor 4. In the case of an embodiment as spring, different spacer elements 21 can also be used for different electric motors 4.

In the case of this second embodiment and also in the case of the third embodiment, which will be described in more detail below, the device housing 2 is advantageously designed for the largest electric motor 4, which is used. As a result, the device housing 2 and a bracket 25 are embodied identically in all embodiments. The device housing 2 is secured to this bracket 25. The bracket 25 serves to close the motor accommodating space 3 in the area of the front side 30 of the electric motor 4. The creation of variations is simplified through this, because only suitable spacer elements 21, which match the electric motors 4, need to be selected.

In the case of a design of the device housing 2 for the largest electric motor 4, which corresponds to the longer electric motor 4a here, the adaptation of the motor accommodating space 3 to this largest electric motor 4a in the case of the second embodiment can occur in that no spacer element 21 is inserted into the motor accommodating space 3. A spacer element 21a, which is assigned to the largest electric motor 4a, is thus not present in FIG. 6, because an axial distance 22 does not need to be bridged in this case. In fact, the axial inner side 23 of the device housing 2 comes directly into contact with the axial outer side 24 of the electric motor 4 in this case.

In the example of the third embodiment according to FIG. 7, the adaptation of the motor accommodating space 3 to different electric motors 4 occurs in that an axial stop 26 is adapted accordingly. The axial stop 26 is integrally molded on the device housing 2 and effects an axial limitation of an insertion depth of the electric motor 4 in the motor accommodating space 3. The adaptation of this axial stop 26 to different motor lengths 11 advantageously occurs in that an axial height 27 of the axial stop 26 is shortened accordingly. The shortening of the axial height 26 of the respective axial stop 26 advantageously occurs by means of a material-removing machining. The axial stop 26 can for example be milled off to the desired height 27.

As can be seen, it can be gathered from FIG. 7 that the respective electric motor 4 comes into axial contact with said axial stop 26 with its axial outer side 24 or with the rear side 31, respectively, when the insertion depth provided for the respective electric motor 4 is reached. For this purpose, the same relative position to the device housing 2 is also ensured for the front side 30 of the electric motor 4 in each case. According to FIG. 8, the respective spacer element 26 can thereby be formed by a plurality of webs 29, which are arranged so as to be distributed in the peripheral direction 28. In the alternative, the axial stop 26 can on principle also be designed so as to be closed in an annular manner.

With regard to its height 27, the axial stop 26, which is integrally molded on the device housing 2, is designed in an initial state, thus in a non-shortened, in particular unmachined state, for the smallest or shortest electric motor 4, respectively, which corresponds to the small electric motor 4c here. The axial stop 26 does not need to be shorted for adaptation to the smallest electric motor 4c in this case. In fact, the axial stop 26 is already formed to match the smallest electric motor 4c. For larger electric motors 4a and 4b, the axial stop 26 needs to be shorted accordingly. It can be seen in FIG. 7 that the axial stop 26 has a smaller height 27 for the average electric motor 4b than for the small electric motor 4. It is further remarkable that the axial stop 26 is completely shortened or completely removed, respectively, for the large or for the largest electric motor 4a, respectively.

The outer side 24 of the electric motor 4 is directly supported on the inner side 23 of the device housing 2 in this case.

In the examples of FIGS. 6 and 7, it is thus possible to exchange the electric motor 4 with a different electric motor 4 comprising a different motor length 11, in that a different spacer element 21 is used or in that the height 27 of the axial stop 26 is adapted accordingly, preferably shortened, respectively.

A method for producing the control device 1 introduced here is characterized in that a suitable electric motor 4 is selected for the respective provided application and that the motor accommodating space 3 is adapted to the motor length 11 of the selected electric motor 4. In the examples of FIGS. 2 to 5, the adaptation of the motor accommodating space 3 occurs in that a cover 13, which is suitable for the selected electric motor 4, is selected.

In the example of FIG. 6, the adaptation of the motor accommodating space 3 occurs in that a spacer element 21, which is suitable for the selected electric motor 4, is selected and is inserted into the motor accommodating space 3. In the special case that the device housing 2 is designed to match the largest electric motor 4a and that the selected electric motor 4 is the largest electric motor 4a, no spacer element 21 is selected and is inserted into the motor accommodating space 3. In this special case, the electric motor 4 is thus inserted into the motor accommodating space 3 without spacer element 21.

In the example of FIG. 7, the adaptation of the motor accommodating space 3 occurs in that the axial stop 26 is adapted, preferably shortened, to the respective selected electric motor 4 with regard to its axial height 27. In a first special case, in which the smallest electric motor 4c is selected, such an adaptation of the height 27 of the axial stop 26 can be forgone, when the axial stop 26 in the unmachined state is designed for this smallest electric motor 4c. In a second special case, in which the largest electric motor 4a is used, provision can be made for the axial stop 26 to be completely removed when the device housing 2 is designed to match the largest electric motor 4a. As a result, the largest electric motor 4a can then be directly supported on the device housing 2, thus not via the axial stop 26.

The invention claimed is:

1. A method for producing a control device for mechanically controlling a component, the control device having a device housing and a cover configured to close the device housing, the device housing and the cover defining an interior space, at least a portion of the interior space defining a motor accommodating space for receiving one of a plurality of electric motors each suitable for a specified application, the method comprising:

selecting an electric motor from the plurality of electric motors, the plurality of electric motors respectively including a motor housing having a stator and a rotor including a rotor shaft, each of the plurality of electric motors having a different respective axial motor length that extends from a first axial end of the motor housing to a second axial end of the motor housing and having a same respective radial motor cross section; and adapting the motor accommodating space to the selected electric motor via adjusting an axial length of the motor accommodating space to correspond to the respective axial motor length of the selected electric motor;

wherein the axial length of the motor accommodating space is a distance from an axial inner surface of the cover to an axial support surface disposed within the interior space of the device housing, the first axial end of the motor housing resting on the axial support surface when the selected electric motor is disposed within the motor accommodating space.

2. The method according to claim 1, wherein adapting the motor accommodating space includes i) selecting the cover from a plurality of covers that each have a different respective axial cover length such that the axial length of the motor accommodating space corresponds to the respective axial motor length of the selected electric motor when the selected cover is installed on the device housing and ii) installing the selected cover on the device housing to adjust the axial length of the motor accommodating space; and wherein the axial support surface is defined by an axial inner surface of the device housing that delimits an axial end of the interior space each of the plurality of covers define a different axial length for the motor accommodating space when installed.

3. The method according to claim 2, wherein installing the selected cover on the device housing includes welding the selected cover to the device housing, wherein the device housing is plastic and the cover is plastic.

4. The method according to claim 2, wherein installing the selected cover on the device housing includes coupling the cover to the device housing with a crimped connection, wherein the device housing is one of metal and plastic, and the cover is metal.

5. The method according to claim 2, further comprising structuring the device housing, prior to adapting the motor accommodating space, such that a portion of the axial length of the motor accommodating space within the device housing corresponds to a respective one of the plurality of electric motors having the shortest respective axial motor length.

6. The method according to claim 1, wherein adapting the motor accommodating space includes:

selecting a spacer element suitable for the selected electric motor from a plurality of spacer elements each having a different axial extent, the selected spacer including the axial support surface; and changing an axial distance between an axial inner surface of the device housing that delimits an axial end of the interior space and the first axial end of the motor housing to increase or decrease the axial length of the motor accommodating space based on the respective axial motor length of the selected electric motor via inserting the selected spacer element into the interior space.

7. The method according to claim 6, wherein the selected spacer element is one of a spring and a sleeve.

8. The method according to claim 6, further comprising structuring the device housing, prior to adapting the motor accommodating space, such that the motor accommodating space is sized to receive a respective one of the plurality of electric motors having the largest respective axial motor length with the first axial end of the motor housing in direct contact with the axial inner surface of the device housing such that the axial support surface is defined by the axial inner surface of the device housing.

9. The method according to claim 8, wherein adapting the motor accommodating space further includes selecting no spacer element and inserting no spacer element into the motor accommodating space when the respective one of the plurality of electric motors having the largest respective axial motor length is selected.

10. The method according to claim 1, wherein:

adapting the motor accommodating space includes changing an axial insertion depth of the selected electric motor to adjust the axial length of the motor accommodating space based on the respective axial motor length of the selected electric motor via shortening an axial height of an axial stop to a desired axial height suitable for the selected electric motor; and the axial stop is integrally disposed on the device housing within the interior space and defines the axial support surface such that the first axial end of the motor housing is supported at an axial distance from an axial inner surface of the device housing that delimits an axial end of the interior space.

11. The method according to claim 10, further comprising structuring the axial stop, prior to adapting the motor accommodating space, such that the axial height of the axial stop is configured for a respective one of the plurality of electric motors having the smallest respective axial motor length.

12. The method according to claim 11, wherein adapting the motor accommodating space further includes not shortening the axial height of the axial stop when the respective one of the plurality of electric motors having the smallest respective axial motor length is selected.

13. The method according to claim 10, wherein shortening the axial height of the axial stop includes completely removing the axial stop such that the axial support surface is defined by the axial inner surface of the device housing when a respective one of the plurality of electric motors having the largest respective axial motor length is selected.

14. A control device for mechanically controlling a component, comprising:

a device housing and a cover configured to close the device housing, the device housing and the cover defining an interior space, at least a portion of the interior space defining a motor accommodating space;

the motor accommodating space having an axial length extending from an axial inner surface of the cover to an axial support surface disposed within the interior space of the device housing;

an electric motor arranged within the motor accommodating space, the motor including a motor housing having a rotor and a stator disposed therein, the rotor including a rotor shaft on a front side of the motor housing, wherein the motor housing defines an axial motor length extending from the front side to a rear side of the motor housing facing an axial inner surface of the device housing that delimits an axial end of the interior space;

at least one of an axial stop and a spacer element disposed within the device housing and including the axial support surface, the at least one of the axial stop and the spacer element disposed between and in contact with the rear side of the motor housing and the axial inner surface of the device housing such that the electric motor is supported within the motor accommodating space via the at least one of the axial stop and the spacer element; and wherein the axial length of the motor accommodating space is adjustable to correspond to the axial motor length of the motor via at least one of i) exchanging the spacer element for a different spacer element having a different axial dimension and ii) reducing an axial dimension of the axial stop, such that a different electric motor having a different axial motor length is insertable into the motor accommodating space.

15. A control device for mechanically controlling a component, comprising:

a device housing;

a common cover coupled to and closing the device housing, the device housing and the cover defining an interior space, at least a portion of the interior space at least partially defining a motor accommodating space configured to receive an electric motor including a motor housing having an axial side wall;

the motor accommodating space having an axial length extending from an axial inner surface of the cover to an axial support surface disposed within the interior space of the device housing;

at least one of an integral axial stop and an exchangeable spacer element arranged within the device housing, the at least one of the axial stop and the spacer element including the axial support surface and configured to axially support the electric motor via contacting the axial side wall of the motor housing and an axial side wall of the device housing that delimits the interior space such that the axial side wall of the motor housing is disposed an adjustable axial distance from the axial side wall of the device housing when the electric motor is arranged within the motor accommodating space;

wherein the motor accommodating space has a radial cross section complimentary to a radial cross section of the motor housing; and wherein the adjustable axial distance is adjustable based on an axial motor length of the electric motor such that the electric motor is fittingly arranged within the device housing when received in the motor accommodating space and the common cover closes the motor accommodating space via at least one of i) exchanging the spacer element for a different spacer element and ii) removing a portion of the axial stop.

16. The method according to claim 6, wherein:
the cover is a common cover compatible with each of the plurality of electric motors;
the method further comprises installing the common cover on the device housing regardless of which one of the plurality of electric motors is selected such that the interior space has a common axial length extending from the axial inner surface of the cover to the axial inner surface of the device housing; and
the selected spacer element inserted into the motor accommodating space has an axial length complimentary to the respective axial motor length of the selected electric motor such that a total axial length of the selected spacer element and the selected electric motor corresponds to the common axial length of the interior space.

17. The method according to claim 10, wherein:
the cover is a common cover compatible with each of the plurality of electric motors;
the method further comprises installing the common cover on the device housing regardless of which one of the plurality of electric motors is selected such that the interior space has a common axial length extending from the axial inner surface of the cover to the axial inner surface of the device housing; and
the desired axial height of the axial stop is complimentary to the respective axial motor length of the selected electric motor such that a total axial length of the axial stop and the selected electric motor corresponds to the common axial length of the interior space.

18. The method according to claim 10, wherein shortening the axial height of the axial stop includes removing at least a portion of the axial stop via material-removing machining the axial stop.

19. The method according to claim 1, wherein:
adapting the motor accommodating space includes:
selecting the cover from a plurality of covers that each have a different respective axial cover length;
selecting a spacer element suitable for the selected electric motor from a plurality of spacer elements each having a different axial extent, the selected spacer including the axial support surface;
inserting the selected spacer element into the interior space; and
installing the selected cover on the device housing to adjust the axial length of the motor accommodating space; and
the cover and the spacer element are selected such that the axial length of the motor accommodating space corresponds to the respective axial motor length of the selected electric motor.

20. The method according to claim 1, wherein:
adapting the motor accommodating space includes:
selecting the cover from a plurality of covers that each have a different respective axial cover length;
shorting an axial height of an axial stop to a desired axial height suitable for the selected electric motor, the axial sop integrally disposed on the device housing within the interior space and defining the axial support surface; and
installing the selected cover on the device housing to adjust the axial length of the motor accommodating space; and
the cover is selected and the axial stop is shortened such that the axial length of the motor accommodating space corresponds to the respective axial motor length of the selected electric motor.

* * * * *